United States Patent [19]

Allen et al.

[11] Patent Number: 4,846,588
[45] Date of Patent: Jul. 11, 1989

[54] DEBRIS COLLECTOR BAG

[75] Inventors: Frank R. Allen, Columbia, S.C.; John Hopkins, Charlotte, N.C.

[73] Assignee: Textron Inc., Providence, R.I.

[21] Appl. No.: 220,090

[22] Filed: Jul. 18, 1988

[51] Int. Cl.[4] .................. B65D 33/00; A01D 34/12
[52] U.S. Cl. .................................... 383/41; 383/42; 220/1 T; 56/202
[58] Field of Search ............ 383/41, 42, 16, 66, 383/97; 220/1 T; 56/202

[56] References Cited
U.S. PATENT DOCUMENTS

| | | | |
|---|---|---|---|
| 3,421,302 | 1/1969 | Dahl | 56/202 |
| 3,521,436 | 7/1970 | Venzke | 56/202 |
| 3,579,966 | 5/1971 | Allina | 56/202 |
| 4,156,339 | 5/1979 | Dunn et al. | 56/202 |
| 4,344,274 | 8/1982 | Heismann | 383/42 |
| 4,693,064 | 9/1987 | Katayama | 56/202 |

Primary Examiner—Willis Little
Attorney, Agent, or Firm—Abraham Ogman

[57] ABSTRACT

The invention is directed to a debris collector bag for receiving grass clippings, leaves and debris which has a concave surface in which includes a concave slit opening from which the collected debris is removed.

10 Claims, 1 Drawing Sheet

U.S. Patent  Jul. 11, 1989  4,846,588
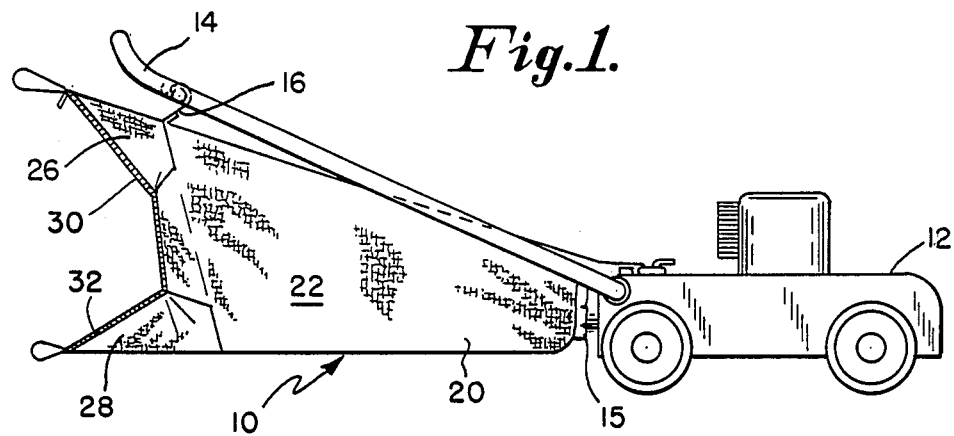
Fig.1.
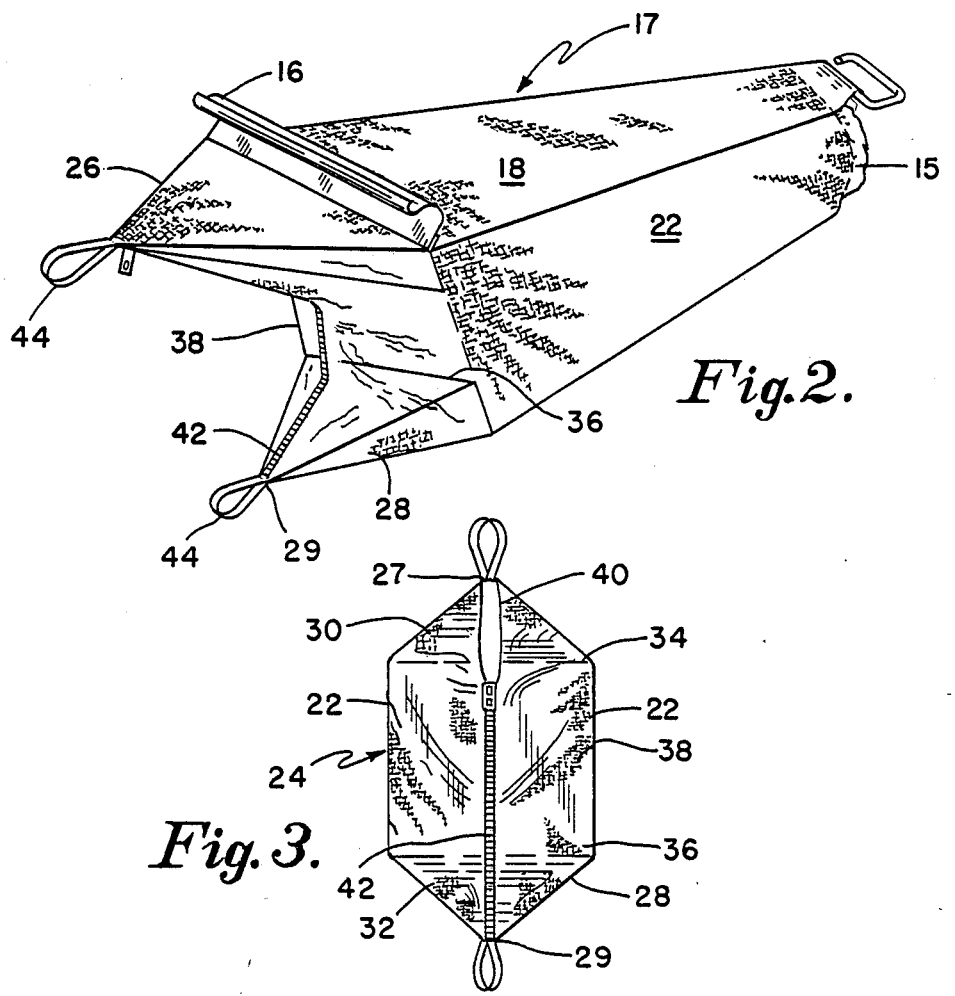
Fig.2.
Fig.3.

DEBRIS COLLECTOR BAG

The invention is directed to a debris collector bag of the type used on lawn mowers to collect grass clippings, or on a vacuum apparatus to collect leaves or other debris.

BACKGROUND

In recent years outdoor equipment which either cut and collect or simply collect grass, leaves, debris and the like come equipped with bags which collect the debris as it is produced or picked up by the apparatus.

A long felt need was to make a bag which can be emptied quickly and efficiently. Heretofore many such debris collector bags were emptied through the opening in which the debris entered the bag.

In many other cases zippered openings were provided in the bag for the purpose of emptying the debris. In general however these zippered opening were relatively small. Debris exited these openings reluctantly particularly if the debris tended to mat as in the case of long grass or wet grass and leaves.

The size of the exit opening through which debris exits the collector bag is generally dictated by the size of the apparatus. In the case of "walk behind" mowers or portable vacuums—the technologies in which this invention finds significant application and use—the exit openings tend to be more limited than the capacity of the bag itself as these apparatus dictate the use of conventional bags with limited space for exit openings.

OBJECTS

It is an object of the invention to provide a debris collector bag which avoids the disadvantages and limitations of such prior bags.

It is another object of the invention to provide a debris collector bag which includes a larger exit opening than that of a corresponding conventional bag.

It is yet another object of the invention to provide a debris collector bag in which the structure in which an exit opening is defined is concave in order to increase the linear dimension of the opening.

It is still another object of the invention to provide a debris collector bag which includes one or more lateral extensions for increasing the volume of the bag and for providing a larger exit opening.

STATEMENT OF THE INVENTION

In accordance with the invention a debris collector bag includes means for attaching a debris collector bag to an apparatus which produces collectable debris. For purposes of this discussion such an apparatus may be referred to as a harvesting apparatus.

The bag includes a closed container defined by peripheral walls and top and bottom plates. An opening, generally at the front wall of the bag, is provided for receiving debris. The container also includes a wall in which an exit opening is defined. The wall includes a hollow lateral extension containing a plurality of faces. The exit opening is formed in part in a face of the hollow lateral extension so as to increase the linear dimension of the wall in which the exit opening is constructed. The exit opening includes a closure.

THE DRAWINGS

The novel features that are considered characteristic of the invention itself, however, both as to its organization and method of operation, together with additional objects and advantages thereof, will best be understood from the following description of a specific embodiment, when read in conjunction with the accompanying drawings, in which:

FIG. 1 shows a debris collector bag embodying the principles of the invention attached to a lawn mower.

FIG. 2 is a perspective sketch of the debris collector bag.

FIG. 3 is an end view of the bag showing size of the exit opening relative to size of container.

DETAILED DESCRIPTION OF THE INVENTION

Referring to FIG. 1 there is shown a debris collector bag 10 attached to a lawn mower 12. A mower with a rear bag is illustrated. The invention will work as well with a mower having a collector bag attached to a side discharge chute of the mower. The attachment is quite conventional in that an opening abuts the lawn mower 12 to receive debris through an opening 15. The bag 10 is attached to the handle 14 of the lawn mower by means of elongated curved hook like member 16.

The debris collector bag 10 includes a closed container 17 defined by side walls 22, top and bottom walls 18 and 20, respectively. An opening 15 for receiving debris is seen in FIG. 2.

The container 17 further includes a rear wall 24 which includes a pair of lateral hollow extensions in the shape of pyramids 26 and 28. Pyramid 26 includes a face 30 which is opposite a confronting face 32 on pyramid 28. A base 34 on face 30 and a base 36 on face 32 join with a mid-section 38 to form the continuous rear or back wall 24. The back wall may comprise solely the faces 30 and 32 if one elects to join the bases 36 and 38 and omit the mid-section 38.

Each pyramid shown in the figures has four faces. This is a matter of choice as a pyramid having multiple faces may also be chosen. The pyramids peak at 27 and 29.

Additionally while the figures show two lateral extensions or pyramids it is clear that the use of a single extension is also contemplated by the invention. Further, the shape of the extensions 26 and 28 may vary by choice.

An exit opening 40 is defined in the rear wall 24. The exit opening 40 is preferably a slit opening extending across the concave wall. The slit opening 40 includes preferably a zippered closure 42. A pair of tabs 44 are provided to facilitate operating the zipper.

Other froms of closures may be used as for example interlocking fabric strips sold under the Tradename Velcro. Buttons and snaps may also be used as well as folded fabric with a slide on locking device.

The exit opening 40 starts at the peak 27 of the pyramid 26 and extends across the length of face 30, across the mid-section 38, across the face 32 and terminates at the peak 29 of the pyramid 28. A U-shaped or concave wall results from the described structure.

The mid section 38 in a conventional construction would define the limits of the bag 10 and the limited size of an exit opening constructed in this section. It is clear, particularly from FIG. 3, that the opening 40 because of the lateral extensions or pyramids is much longer than that which may be formed in the midsection 38. In other words the U-shaped or concave wall configuration makes it possible to increase the linear size of the exit opening 40 without increasing the overall height or width of the collector bag.

The debris collector bag 10 is preferably formed from a flexible fabric. A molded container is also contemplated as an alternate form of closure for the exit opening. In this case an different type of closure will be required. A third construction is flexible fabric rear wall containing a slit opening as illustrated in combination with a molded container.

The performance of the U-shaped exit opening when compared with a more conventional construction where the rear wall resembles the mid-section 38 is much better overall. It is outstanding when matted debris is being handled.

The various features and advantages of the invention are thought to be clear from the foregoing description. Various other features and advantages not specifically enumerated will undoubtedly occur to those versed in the art, as will many variations and modifications of the preferred embodiment illustrated, all of which may be achieved without departing from the spirit and scope of the invention as defined by the claims.

What is claimed is:

1. A debris collector bag including means for attaching the bag to a harvesting apparatus comprising:
   a closed container having a front and back wall, said front wall has a first opening for receiving debris, said back wall having a front to back curved lateral extension for enlarging the linear dimension of said back wall;
   a second opening for removing debris from the bag constructed across the enlarged linear dimension of the rear wall; and
   a closure for the second opening.

2. A debris collector bag including means for attaching the bag to a harvesting apparatus comprising:
   a closed container having a front and back wall, said front wall has a first opening for receiving debris, said back wall being U-shaped and formed by a pair of spaced first and second pyramids having first and second peaks and bases, and first and second confronting faces, said pyramids are joined at the bases of the confronting faces;
   a second opening for removing debris from the bag starting at the first peak and proceeding down the first confronting face of the first pyramid across and up the second confronting face of the second pyramid to the second peak; and
   a closure for said second opening.

3. A debris collector bag as defined in claim 2 where the pyramids have four faces.

4. A debris collector bag as defined in claim 2 where the bases of the pyramids are joined to a mid-section and the opening and closure traverses the mid-section.

5. A debris collector bag as defined in claim 4 where the mid-section is rectangular in form.

6. A debris collector bag as defined in claim 2 where the second opening is a slit opening.

7. A debris collector bag as defined in claim 6 where the closure for the slit opening is a zipper.

8. A debris collector bag as defined in claim 1 where the rear wall is concave.

9. A debris collector bag as defined in claim 8 where the concave surface is U-shaped, said opening is a slit which conforms to the U-shape.

10. A debris collector as defined in claim 9 where the closure is a zipper.

* * * * *